US012621605B2

(12) United States Patent
Tao et al.

(10) Patent No.: US 12,621,605 B2
(45) Date of Patent: May 5, 2026

(54) AUDIO PLAYBACK DEVICE, AUDIO PLAYBACK METHOD THEREOF AND STORAGE MEDIUM

(71) Applicants: K-Tronics (Suzhou) Technology Co., Ltd., Suzhou (CN); BOE Technology Group Co., Ltd., Beijing (CN)

(72) Inventors: Biao Tao, Beijing (CN); Desheng Li, Beijing (CN); Zhongcai Dong, Beijing (CN)

(73) Assignees: K-Tronics (Suzhou) Technology Co., Ltd., Suzhou (CN); BOE Technology Group Co., Ltd., Beijing (CN)

( * ) Notice: Subject to any disclaimer, the term of this patent is extended or adjusted under 35 U.S.C. 154(b) by 155 days.

(21) Appl. No.: 18/687,831

(22) PCT Filed: Aug. 10, 2023

(86) PCT No.: PCT/CN2023/112176
§ 371 (c)(1),
(2) Date: Feb. 29, 2024

(87) PCT Pub. No.: WO2024/046079
PCT Pub. Date: Mar. 7, 2024

(65) Prior Publication Data
US 2025/0142255 A1 May 1, 2025

(30) Foreign Application Priority Data
Aug. 31, 2022 (CN) ......................... 202211057463.2

(51) Int. Cl.
*H04R 3/04* (2006.01)
*H04R 1/02* (2006.01)
*H04R 29/00* (2006.01)

(52) U.S. Cl.
CPC ............... *H04R 3/04* (2013.01); *H04R 1/028* (2013.01); *H04R 29/001* (2013.01); *H04R 2430/01* (2013.01)

(58) Field of Classification Search
CPC ........ H04R 3/04; H04R 1/028; H04R 29/001; H04R 2430/01; H04R 3/00; G06F 3/165
(Continued)

(56) References Cited

U.S. PATENT DOCUMENTS 5,744,743 A 4/1998 De Poli et al.
6,154,550 A 11/2000 Beyer
(Continued)

FOREIGN PATENT DOCUMENTS

CN 110265042 A 9/2019
CN 110933486 A 3/2020
(Continued)

OTHER PUBLICATIONS

International Search Report for PCT/CN2023/112176 Mailed Nov. 9, 2023.

*Primary Examiner* — Carolyn R Edwards
*Assistant Examiner* — Friedrich Fahnert
(74) *Attorney, Agent, or Firm* — Ling Wu; Stephen Yang; Ling and Yang Intellectual Property

(57) ABSTRACT

Provided are an audio playback device, an audio playback method thereof, and a storage medium. The audio playback method include: acquiring an audio resonance table of the audio playback device, the audio resonance table includes one or more first frequency points and a first audio gain corresponding to the first frequency points, when the audio playback device outputs audio using the first audio gain at the first frequency point, the signal gain of the generated harmonic band signal is less than or equal to a preset harmonic gain threshold; processing the audio to be output
(Continued)

according to the first frequency point and the first audio gain in the audio resonance table; and outputting the processed audio.

10 Claims, 5 Drawing Sheets

(58) Field of Classification Search
USPC .......................................................... 381/56
See application file for complete search history.

(56) References Cited

U.S. PATENT DOCUMENTS

2016/0080863 A1* 3/2016 Rutledge .................. H04R 3/02
381/93
2018/0136899 A1* 5/2018 Risberg .................... H04R 3/04
2020/0322714 A1* 10/2020 Alva .................... H04R 29/001

FOREIGN PATENT DOCUMENTS

CN 111128167 A 5/2020
CN 112562708 A 3/2021
CN 115437599 A 12/2022

* cited by examiner

AUDIO PLAYBACK DEVICE, AUDIO PLAYBACK METHOD THEREOF AND STORAGE MEDIUM

CROSS-REFERENCE TO RELATED APPLICATIONS

The present application is a U.S. National Phase Entry of International Application No. PCT/CN2023/112176 having an international filing date of Aug. 10, 2023, which claims the priority of the patent application No. 202211057463.2, filed to the CNIPA on Aug. 31, 2022 and entitled "Audio Playback Device, Audio Playback Method Thereof and Storage Medium". The above-identified applications are hereby incorporated by reference.

TECHNICAL FIELD

Embodiments of the disclosure relates to but is not limited to the technical field of audio, in particular to an audio playback device, an audio playback method thereof and a storage medium.

BACKGROUND

With its portability and powerful processing power, laptop computer has become an important office tool in daily life. However, in the process of playing music or video with speakers, laptops often produce "sizzling" noises, which affects the user experience.

SUMMARY

The following is a summary of subject matters described herein in detail. This summary is not intended to limit the protection scope of claims.

An Embodiment of the Present Disclosure Provides an Audio Playback Method of an Audio Playback Device, Including:

acquiring an audio resonance table of the audio playback device, wherein the audio resonance table includes one or more first frequency points and a first audio gain corresponding to the first frequency points, when the audio playback device outputs audio using the first audio gain at the first frequency point, the signal gain of the generated harmonic band signal is less than or equal to a preset harmonic gain threshold; processing the audio to be output according to the first frequency point and the first audio gain in the audio resonance table; and outputting the processed audio.

In some exemplary embodiments, before the method, it further includes: determining the scan frequency list; performing one or more single frequency point audio tests on each scan frequency point in the scan frequency point list to determine a first audio gain corresponding to each scan frequency point, the single frequency point audio test includes: playing a single frequency point audio, the single frequency point audio generates a baseband signal and a harmonic band signal, determining a signal gain of the harmonic band signal, and recording the audio gain corresponding to the current single frequency point audio as the first audio gain corresponding to the single frequency point when the signal gain of the harmonic band signal is lower than a preset harmonic gain threshold; and generating an audio resonance table of the audio playback device.

In some exemplary embodiments, the performing of one or more single frequency point audio tests on each scan frequency point in the scan frequency point list includes: initializing the audio gain of the current scan frequency point; outputting a single frequency point audio of the current scan frequency point, wherein the single frequency point audio is propagated through vibration of air and a structural member of the audio playback device to generate a baseband signal and a harmonic band signal; determining the signal gain of the harmonic band signal and determining whether the signal gain of the harmonic band signal is less than or equal to a preset harmonic gain threshold; when the signal gain of the harmonic band signal is less than or equal to the preset harmonic gain threshold, recording the audio gain of the current output single frequency point audio as the first audio gain corresponding to the current scan frequency point; and when the signal gain of the harmonic band signal is greater than the preset harmonic gain threshold, reducing the audio gain of the current single frequency point audio, and returning to the step of outputting the single frequency point audio of the current scan frequency point and continuing to execute in a loop.

In some exemplary embodiments, when reducing the audio gain of the current output single frequency point audio, the audio gain is varied by z dB each time, where z is between −1 and −3.

In some exemplary embodiments, the determining of the scan frequency list includes: determining a lowest scan frequency point located between 20 Hz and 30 Hz, a highest scan frequency point located between 450 Hz and 650 Hz, and a frequency scan step size.

In some exemplary embodiments, the preset harmonic gain threshold is less than-1 dB.

In some exemplary embodiments, the method further includes: acquiring an equalizer data table of the audio playback device; generating a comprehensive signal gain table according to the audio resonance table and the equalizer data table; and processing the audio to be output according to the comprehensive signal gain table.

In some exemplary embodiments, the generating of a comprehensive signal gain table according to the audio resonance table and the equalizer data table includes: generating an initial signal gain table according to the equalizer data table; extracting all first frequency points in the audio resonance table where the first audio gain is less than the maximum audio gain; and inserting all extracted first frequency points whose first audio gain is less than the maximum audio gain and their corresponding first audio gain into the initial signal gain table to obtain the comprehensive signal gain table.

An embodiment of the disclosure further provides an audio playback device, including a memory; and a processor coupled to the memory, the processor is configured to, based on instructions stored in the memory, perform the steps of the audio playback method as described in any embodiment of the present disclosure.

An embodiment of the present disclosure further provides a storage medium on which a computer program is stored, and when the program is executed by the processor, the audio playback method as described in any embodiment of the present disclosure is implemented.

An embodiment of the disclosure further provides an audio playback device including an audio output unit and a process unit, wherein: the process unit is configured for acquiring an audio resonance table of the audio playback device, wherein the audio resonance table includes one or more first frequency points and a first audio gain corresponding to the first frequency points, when the audio playback device outputs audio using the first audio gain at the first frequency point, the signal gain of the generated harmonic band signal is less than or equal to a preset harmonic gain threshold; processing the audio to be output according to the first frequency point and the first audio gain in the audio resonance table; and outputting the processed audio to the audio output unit; and the audio output unit is configured for playing the processed audio.

In some exemplary embodiments, the audio playback device further includes an audio recording unit, wherein: the audio recording unit includes a microphone sensor and a recording process module connected with the microphone sensor, the recording process module is configured for converting an analog signal recorded by the microphone sensor into a digital signal; and the audio output unit includes a speaker.

In some exemplary embodiments, the audio playback device further includes a keyboard, the keyboard includes multiple keys, the multiple keys include at least one first key having an area greater than or equal to a preset area threshold, wherein: there is one or multiple the microphone sensors, and at least one of the microphone sensors is disposed in the area where the first key is located.

Other aspects may be comprehended upon reading and understanding drawings and detailed description.

BRIEF DESCRIPTION OF DRAWINGS

Accompany drawings are used to provide further understanding of technical solution of the present disclosure, and form a part of the description. The accompany drawings and embodiments of the present disclosure are adopted to explain the technical solution of the present disclosure, and do not form limitations on the technical solution of the present disclosure.

DETAILED DESCRIPTION

Figure 1:
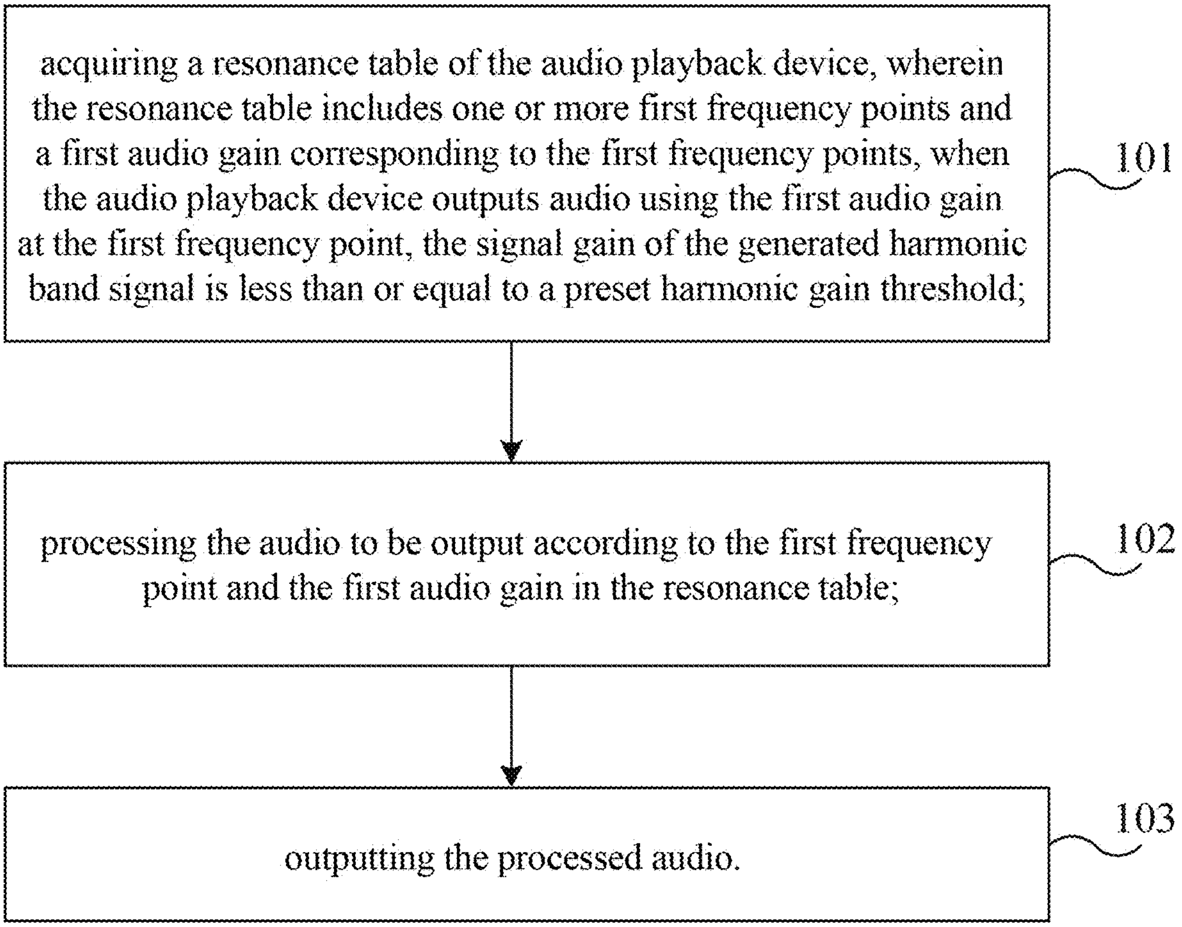
FIG. 1 is a schematic flowchart of an audio playback method according to an exemplary embodiment of the present disclosure.

To make the objectives, technical solutions, and advantages of the present disclosure clearer, the embodiments of the present disclosure will be described in detail below with reference to the accompany drawings. Implementation modes may be implemented in multiple different forms. Those of ordinary skills in the art can easily understand such a fact that implementation modes and contents may be transformed into various forms without departing from the purpose and scope of the present disclosure. Therefore, the present disclosure should not be explained as being limited to the contents recorded in the following implementations only. The embodiments and features in the embodiments of the present disclosure may be randomly combined with each other if there is no conflict.

Scales of the drawings in the present disclosure may be used as a reference in actual processes, but are not limited thereto. For example, a width-length ratio of a channel, a thickness and spacing of each film layer, and a width and spacing of each signal line may be adjusted according to actual needs. A quantity of pixels in a display panel and a quantity of sub-pixels in each pixel are not limited to numbers shown in the drawings. The drawings described in the present disclosure are structural schematic diagrams only, and one mode of the present disclosure is not limited to shapes, numerical values, or the like shown in the drawings.

Ordinal numerals “first”, “second”, “third”, etc., in the specification are set not to form limits in numbers but only to avoid confusion between composition elements.

Through actual test and analysis, the “sizzling” noise in the process of playing music or video with speakers in laptop computers is due to the resonance between the keycap of notebook keyboard and the sound emitted by speakers. This resonance frequency band is usually in the low frequency band of 20 Hz~500 Hz, which may be different for different models. For example, for some models, this resonance frequency band may occur in the low frequency band of 20 Hz~600 Hz.

By using soft foot pads made of silica gel on speakers, the vibration transmitted by speakers to the keyboard through fixed brackets or adhesive surfaces can be reduced to a certain extent, which is equivalent to suppressing the propagation path of noise vibration. However, the vibration transmitted by speakers to the keyboard has not been fundamentally eliminated, and once some audio output streams with self-gain are appeared, keyboard resonance will still occur, so this way cannot fundamentally reduce the probability of keyboard resonance.

By adjusting the Equalizer (EQ) of the speaker and reducing the low-frequency gain, the low-frequency vibration can also be suppressed. However, this low-frequency suppression method will bring about the problems of weak bass, weak subwoofer output, weak vibration sense and poor user feeling.

As Shown in FIG. 1, an Embodiment of the Present Disclosure Provides an Audio Playback Method for an Audio Playback Device, Including the Following Steps:

Step 101, acquiring an audio resonance table of the audio playback device, wherein the audio resonance table includes one or more first frequency points and a first audio gain corresponding to the first frequency points, when the audio playback device outputs audio using the first audio gain at the first frequency point, the signal gain of the generated harmonic band signal is less than or equal to a preset harmonic gain threshold;

Step 102, processing the audio to be output according to the first frequency point and the first audio gain in the audio resonance table; and Step 103, outputting the processed audio.

According to the first frequency point and the first audio gain in the audio resonance table, the audio playback method of the embodiment of the disclosure processes the audio to be output, which greatly improves the resonance noise of the audio playback device, reduces the rework of the machine, improves the production yield of the production line, improves the quality of the factory, enhances the listening experience of the user when playing the subwoofer audio, and reduces the influence of the low frequency suppression on the bass hearing effect.

In some exemplary embodiments, before the method, the following acts are further included: determining the scan frequency point list; performing one or more single frequency point audio tests on each scan frequency point in the scan frequency point list to determine a first audio gain corresponding to each scan frequency point, herein the single frequency point audio test includes: playing the single frequency point audio, herein the single frequency point audio generates a baseband signal and a harmonic band signal, and determining a signal gain of the harmonic band signal; and generating an audio resonance table of the audio playback device.

In some exemplary embodiments, the generated baseband signal and harmonic band signal may be recorded by an audio recording unit comes with the audio playback device, and Fourier transform (FFT) and harmonic analysis of the baseband signal and harmonic band signal may be performed by a signal process unit comes with the audio playback device to determine a signal gain of the harmonic band signal. In other exemplary embodiments, FFT and harmonic analysis of the generated baseband signal and harmonic band signal may be performed by an external signal processing device to determine the signal gain of the harmonic band signal. In an embodiment of the present disclosure, the signal gain of the harmonic band signal may be expressed in dB values.

In some exemplary embodiments, the performing of one or more single frequency point audio tests on each scan frequency point in the scan frequency point list includes: Initializing the audio gain of the current scan frequency point to the maximum value; outputting a single frequency point audio of the current scan frequency point, wherein the single frequency point audio is propagated through air and vibration of a structural member of the audio playback device to generate a baseband signal and a harmonic band signal; determining the signal gain of the harmonic band signal and determining whether the signal gain of the harmonic band signal is less than or equal to a preset harmonic gain threshold; when the signal gain of the harmonic band signal is less than or equal to the preset harmonic gain threshold, recording the audio gain of the single frequency point audio output by the current audio output unit as the first audio gain corresponding to the current scan frequency point in the audio resonance table; when the signal gain of the harmonic band signal is greater than the preset harmonic gain threshold, reducing the audio gain of the current output single frequency point audio, and returning to the step of outputting the audio of a single frequency point of the current scan frequency point and continuing to execute in a loop.

According to the research of the inventor of the present application, as long as the audio playback device uses the first audio gain to output audio at the first frequency point, the signal gain of the generated harmonic band signal is less than or equal to the preset harmonic gain threshold, then, when the audio playback device uses any audio gain lower than the first audio gain at the first frequency point to output the audio, the signal gain of the generated harmonic band signal will also be less than or equal to the preset harmonic gain threshold. That is, as long as the audio playback device uses the audio gain less than or equal to the first audio gain to output audio at the first frequency point, resonance will not be generated, that is, "sizzling" noise will not be generated.

An embodiment of the present disclosure accurately finds the resonance point of the audio playback device by analyzing the vibration spectrum of each audio playback device, and performing suppressing at the resonance point to obtain an audio resonance table. An exemplary audio resonance table is shown in Table 1.

TABLE 1

An Exemplary Audio Resonance Table

| Index | Frequency | Size | Gain | Base Frequency |
|---|---|---|---|---|
| 1 | 20 | 1 | 0.00 dB | 1 |
| 2 | 21 | 0.84 | −1.51 dB | 1 |
| 3 | 22 | 0.77 | −2.27 dB | 1 |
| 4 | 23 | 1 | 0.00 dB | 1 |
| 5 | 24 | 1 | 0.00 dB | 1 |
| 6 | 25 | 1 | 0.00 dB | 1 |
| . . . | . . . | . . . | . . . | 1 |
| 104 | 123 | 0.23 | −12.77 dB | 1 |
| 105 | 124 | 0.88 | −1.11 dB | 1 |
| . . . | . . . | . . . | . . . | 1 |
| 281 | 300 | 0.62 | −4.15 dB | 1 |
| | . . . | . . . | . . . | 1 |
| 480 | 499 | 1 | 0.00 dB | 1 |
| 481 | 500 | 1 | 0.00 dB | 1 |

In some exemplary embodiments, the determining of the scan frequency point list includes: determining a lowest scan frequency point, a highest scan frequency point, and a frequency scan step.

In some exemplary embodiments, the lowest scan frequency point is between 20 Hz and 30 Hz, and the highest scan frequency point is between 450 Hz and 650 Hz.

In some exemplary embodiments, the frequency scan step may be 1 Hz, however, the embodiments of the present disclosure are not limited to this, and the frequency scan step may be other values, for example, 0.5 Hz, but some resonance frequency points may be missed when the frequency scan step is greater than 1 Hz; and when the frequency scan step is less than 1 Hz, the scan time will increase.

Exemplarily, the lowest scan frequency point is 20 Hz, the highest scan frequency point is 500 Hz, and the frequency scan step size is 1 Hz, however, the disclosed embodiments are not limited thereto.

In some exemplary embodiments, the audio gain of the current scan frequency point may be initialized to 0 dB when the audio gain of the current scan frequency point is initialized. In the embodiment of the present disclosure, 0 dB corresponds to the maximum output capability of the audio playback device (i.e., the maximum audio gain, when the audio gain is higher than 0 dB, the audio playback device will produce broken sound or damage). The maximum output capability of different audio playback devices may be different, but it can be assumed that when the audio gain is set to 0 dB, the output is performed using the maximum output capability of the audio playback device.

In some exemplary embodiments, after the step of reducing the audio gain of the current output single frequency audio and before the step of returning the step of outputting the single frequency point audio of the current scan frequency point and continuing a loop execution, the method further includes: detecting whether the audio gain of the current output single frequency point audio is less than or equal to the preset minimum audio gain; when the audio gain of the current output single frequency point audio is greater than the preset lowest audio gain, executing the step of returning to the step of outputting the single frequency point audio of the current scan frequency point and continuing the cyclic execution; and when the audio gain of the current output single frequency point audio is less than or equal to the preset minimum audio gain, exiting the loop. At this time, the first audio gain of the current scan frequency point can be set to a preset lower negative value (e.g. —100 dB). Exemplarily, the preset minimum audio gain may be −60 dB; however, embodiments of the present disclosure are not limited to this and may be −50 dB or −40 dB for example.

In some exemplary embodiments, prior to the step of determining the signal gain of the harmonic band signal, the method may further include: amplifying the generated baseband signal and harmonic band signal, the baseband signal has the same amplification factor as the harmonic band signal. Because of energy loss, when playing single frequency audio, the signal gain of baseband signal and harmonic band signal may be relatively small, so the power amplifier can amplify the baseband signal and harmonic band signal by the same multiple (in actual operation, the sound signal generated through vibration by the output single frequency audio can be converted into real-time analog signal, and the analog signal can be amplified), which can facilitate the subsequent FFT and harmonic analysis.

In some exemplary embodiments, a structural member of an audio playback device includes a keyboard; however embodiments of the present disclosure are not limited thereto. An embodiment of the present disclosure can also eliminate the noise caused by the resonance between the structural member other than the keyboard and the sound emitted by the speaker.

In some exemplary embodiments, a single frequency point audio per scan frequency point may be played for 1 millisecond; however, embodiments of the present disclosure are not limited in this regard.

In some exemplary embodiments, when reducing the audio gain of the current single frequency point audio, the constant change z dB, $z<0$, may be taken on the basis of the current audio gain each time, or may be dynamically adjusted according to the magnitude of the harmonic gain, the greater the harmonic gain, the greater the reduction.

Exemplarily, z may be between −1 and −3; however, embodiments of the present disclosure are not limited thereto. For example, z can be −3 or −2. For the audio resonance table shown in Table 1, the suppression step z can be −0.01.

In some exemplary embodiments, a preset harmonic gain threshold is less than-1 dB.

Exemplarily, the preset harmonic gain thresholds may be −3 dB or −2 dB or the like; however, embodiments of the present disclosure are not limited thereto. In actual use, the preset harmonic gain threshold can be determined according to the test effect of the actual audio playback device. When the preset harmonic gain threshold value is set to −3 dB, the signal energy of the generated harmonic band signal is less than or equal to half of the signal energy of the generated baseband signal.

In some exemplary embodiments, the first audio gain may be 0 dB or y dB, $y<0$.

Figure 2:
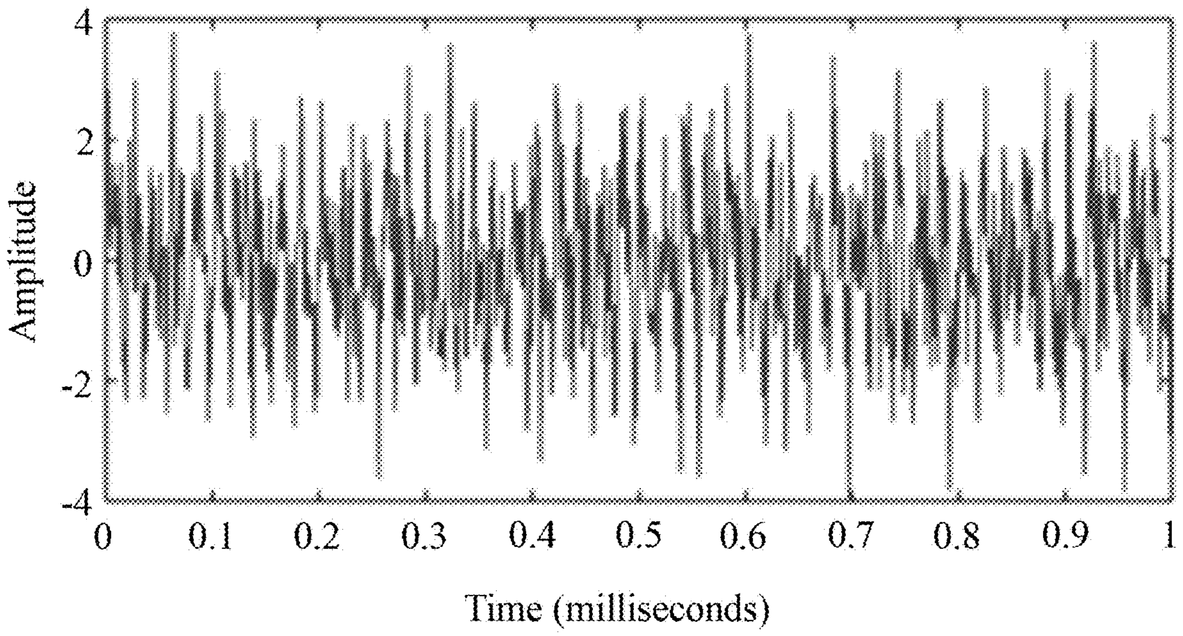
FIG. 2 is a schematic diagram of a time domain signal of a baseband signal and a harmonic band signal according to an exemplary embodiment of the present disclosure.
Figure 3:
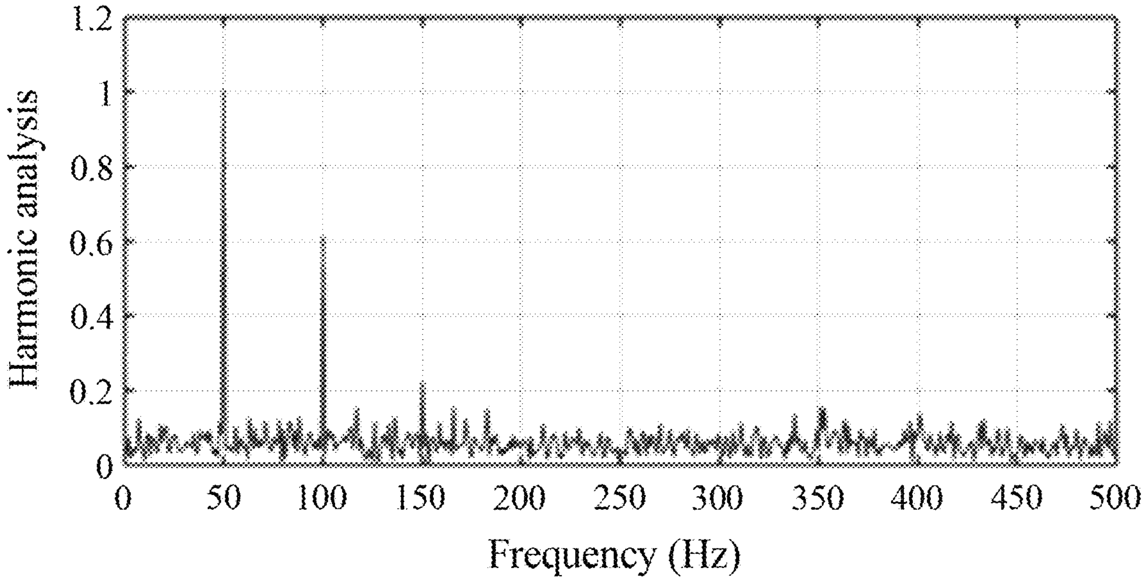
FIG. 3 is a schematic diagram of a frequency domain signal of a baseband signal and a harmonic band signal according to an exemplary embodiment of the present disclosure.

In some exemplary embodiments, the signal gain of the harmonic band signal is determined by performing a Fourier (FFT) transform and harmonic analysis on the baseband signal and the harmonic band signal. FIG. 2 is a schematic diagram of time domain signal of a baseband signal and a harmonic band signal according to an exemplary embodiment of the present disclosure. FIG. 3 is a schematic diagram of a frequency domain signal of a baseband signal and a harmonic band signal according to an exemplary embodiment of the present disclosure. In FIG. 3, the base frequency point is 50 Hz, and the harmonic frequency points are 100 Hz, 150 Hz, etc.

In some exemplary embodiments, the signal gain of the harmonic band signal includes the signal gain of the first frequency multiplier point to the signal gain of the nth frequency multiplier point, where n is a natural number greater than 1.

In some exemplary embodiments, an audio recording unit in an audio playback device may include a microphone sensor and a recording process module coupled to the microphone sensor, the recording process module is configured to convert an analog signal recorded by the microphone sensor into a digital signal.

In some exemplary embodiments, an audio output unit in an audio playback device may include a speaker.

In some exemplary embodiments, the audio playback device may be a laptop computer or the like.

In some exemplary embodiments, the microphone sensor may be placed anywhere in the audio playback device. Exemplarily, the microphone sensor may be placed in an upper position of the screen, a lower position of the screen, an upper left position of the keyboard, an upper right position of the keyboard, a lower position of the keyboard, and the like.

Figure 4:
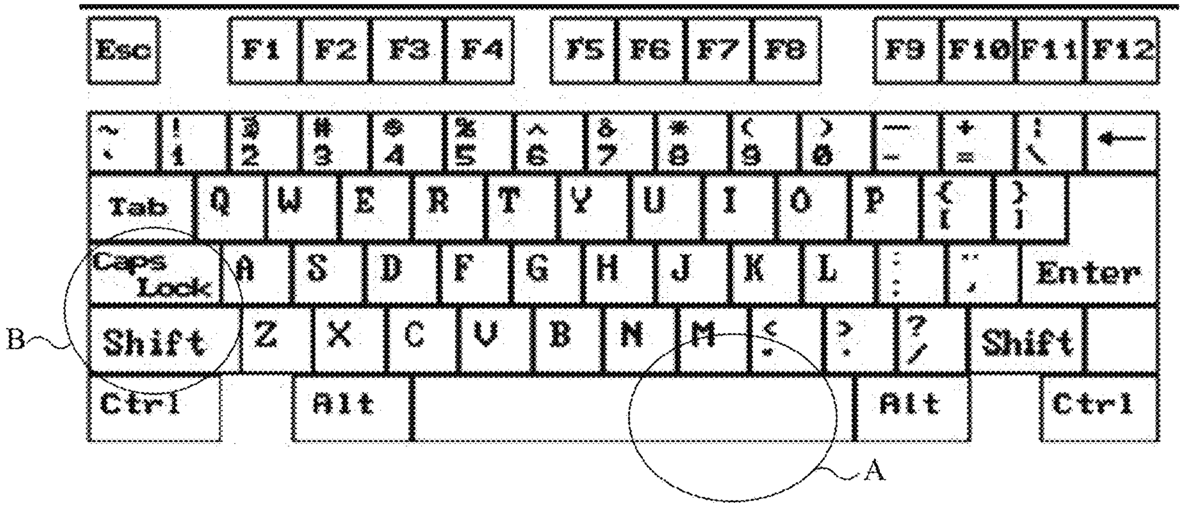
FIG. 4 is a schematic diagram of a microphone sensor installation region according to an exemplary embodiment of the present disclosure.
Figure 5:
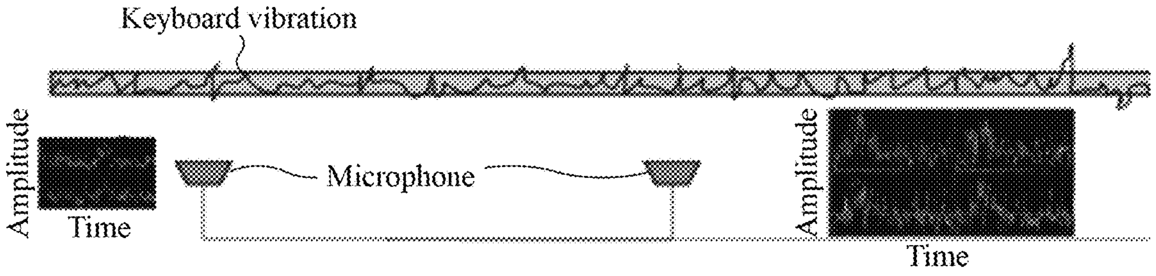
FIG. 5 is a schematic diagram of sound waves generated by keyboard vibration according to an exemplary embodiment of the present disclosure.

In the embodiment of the present disclosure, since the larger the size of the keyboard keycap, the higher the probability of resonance in the low frequency band, the quality of the recorded baseband signal and harmonic band signal is better when the microphone sensor is placed at the lower position of the keyboard. As an example, as shown in FIG. 4, 1-2 microphone sensors can be placed in the region where the space bar is located (position A of FIG. 4) and/or the region where the left Shift key and the Caps Lock key are located (position B of FIG. 4). FIG. 5 is a schematic diagram of sound waves generated by keyboard vibration according to an exemplary embodiment of the present disclosure. When the signal gain of the harmonic band signal is greater than the preset harmonic gain threshold, the sound emitted by the keycap of the notebook keyboard and the speaker resonates, that is, a "sizzling" noise is generated. The embodiment of the present invention actively triggers the resonance of the keyboard by playing a series of sounds of various single frequency point through a speaker, records the generated baseband signal and harmonic band signal through a microphone sensor, analyzes the baseband signal and harmonic band signal, finds the resonant frequency point, and suppresses the audio signal of the resonant frequency point, thereby fundamentally eliminating the problem of keyboard resonance.

In some exemplary embodiments, the method further includes: acquiring an equalizer data table of the audio playback device; generating a comprehensive signal gain table according to the audio resonance table and the equalizer data table; and processing the audio to be output according to the comprehensive signal gain table.

Figure 6:
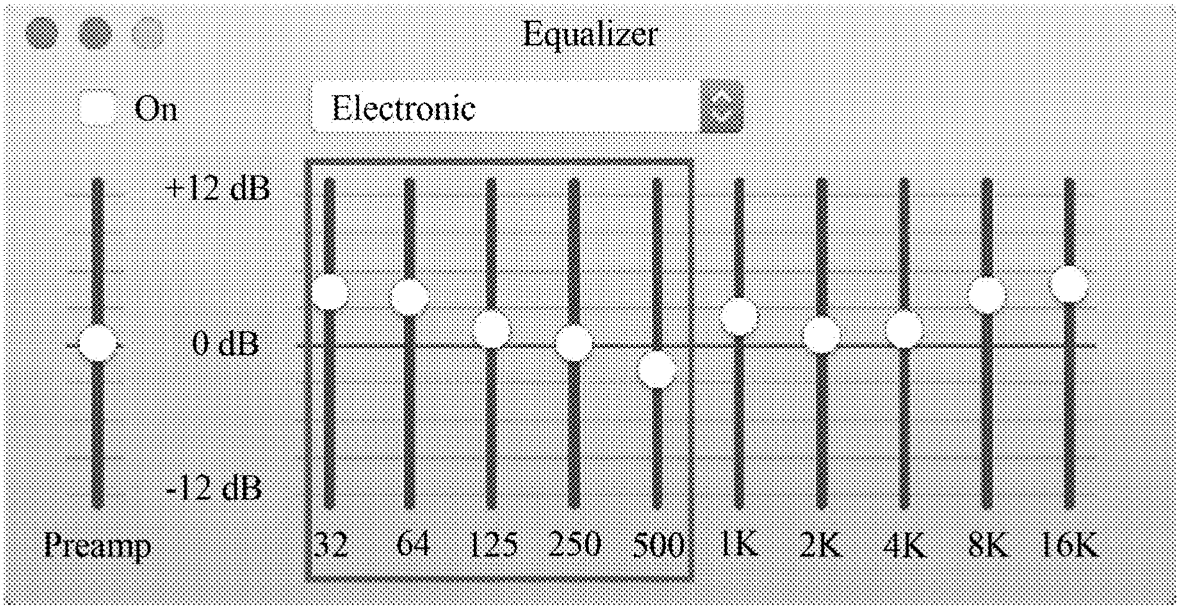
FIG. 6 is a schematic diagram of the signal gain of an equalizer.

An exemplary data table of an equalizer is shown in FIG. 6. An equalizer is an electronic device that can adjust the amplification amount of electrical signals of various frequency components respectively. By adjusting electrical signals of various frequencies, it can compensate for defects of speakers and sound fields, compensate and modify various sound sources and other special functions. Generally, a common equalizer can only adjust electrical signals of multiple frequencies such as high frequency, intermediate frequency and low frequency respectively.

In some exemplary embodiments, a comprehensive signal gain table is generated from an audio resonance table and an equalizer data table, including: generating an initial signal gain table according to the equalizer data table; extracting all first frequency points in the audio resonance table having a first audio gain less than 0 dB; inserting all extracted first frequency points with first audio gain less than 0 dB and corresponding first audio gain into an initial signal gain table to obtain a comprehensive signal gain table.

FIG. 6 is a schematic diagram of the signal gain of an equalizer. As shown in FIG. 6, the sound scene settings of the early Windows system application equalizer include Jazz, Classical, Rock, Electronic and other modes. The performance of these different modes in the audio spectrum is that the audio gain increases in some frequency bands or decreases in some frequency bands, so as to compensate for the deficiency of nonlinearity of speakers, sound field environment or human auditory system perception in the audio range. For example, suppose that the original signal gain of the system in the 32 Hz band (the driving sub-system of the audio playback device has a set of default equalization settings at each frequency point, that is, a set of default original signal gain at each frequency point) is-35 dB. As shown in FIG. 6, the signal gain increment of the equalizer in the 32 Hz band is about 5 dB, and after the adjustment by the equalizer, the signal gain in the 32 Hz band becomes-30 dB. Under 100% volume (in the embodiment of the present disclosure, it can be considered that the meaning of volume and audio gain is the same, the volume is usually used by ordinary users, and the audio gain is usually used by professionals, and the volume 100% means that the audio gain is 0 dB), when the human ear listens to the sound of 1 KHz and the sound of 32 Hz, the sound heard is completely different. Therefore, some application settings will introduce situations that exceed the rated power output of the speaker (such as output+2 dB~+12 dB) to compensate for this auditory difference. In this case, the settings themselves have great risks (which will cause the speaker to break or damage). The next generation of operating systems will also be designed to limit this output. When applying the equalizer gain, if the increment difference of the original signal gain to 0 dB at a certain frequency point is greater than or equal to the equalizer signal gain adjustment increment at that frequency point shown in FIG. 6, the equalizer signal gain adjustment increment is directly added to the original signal gain at that frequency point. If the original signal gain of the frequency point is already 0 dB or the increment difference from the original signal gain of the frequency point to 0 dB is less than the equalizer signal gain adjustment increment of the frequency point shown in FIG. 6, the signal gain of the frequency point is adjusted to 0 dB at most, which is a protection mode at the software level. Another protection mode is applicable to intelligent power amplifier, which directly outputs excess audio signals according to the maximum 0 dB. The audio playback method according to the embodiment of the present disclosure suppresses the amplitude of sound at some resonance frequency points, and after scanning the frequency points, the audio gain of the resonance frequency points is set according to the audio resonance table, regardless of whether the previous equalizer is set at a specific frequency point to be +6 dB or −2 dB.

Figure 7:
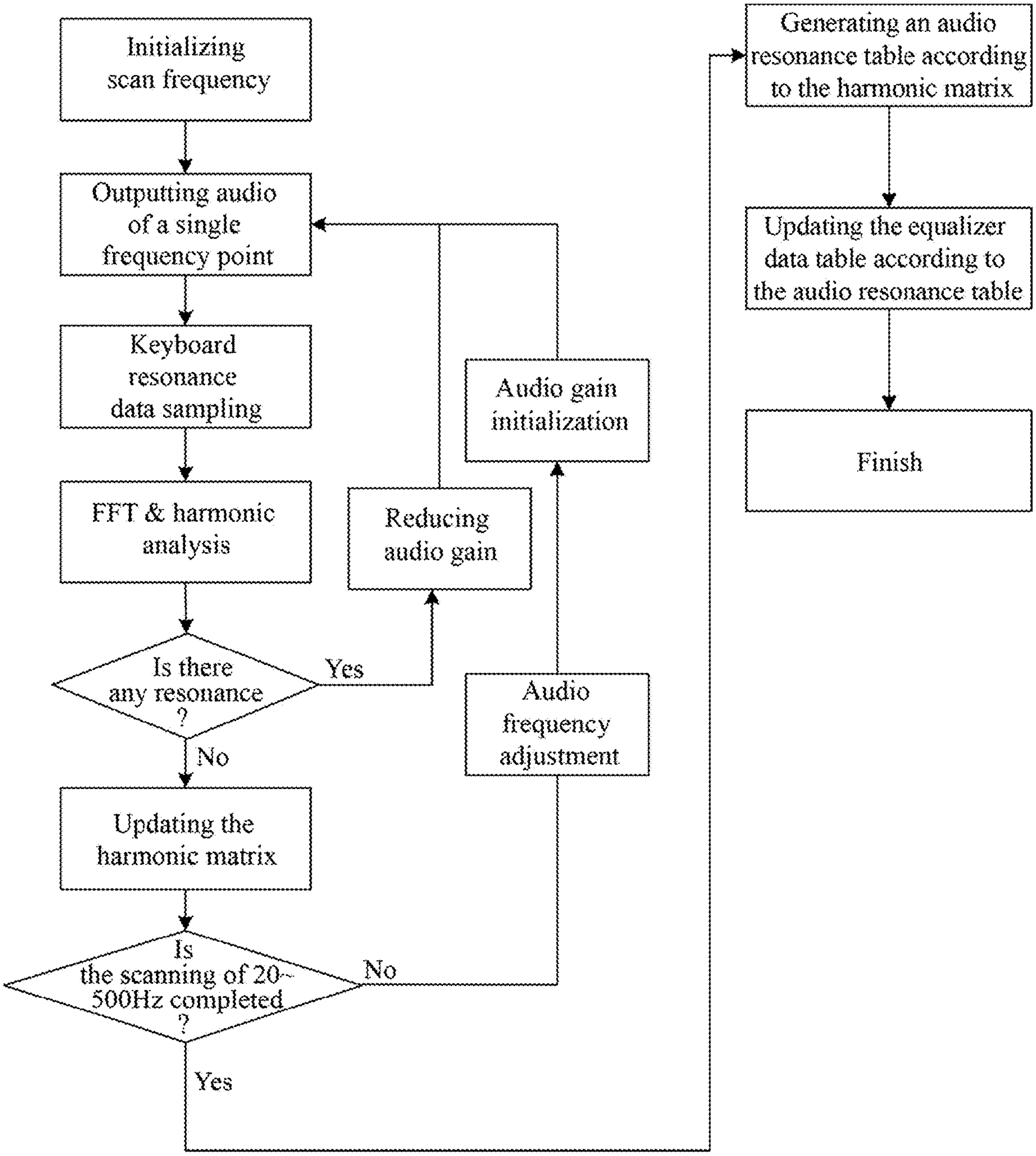
FIG. 7 is a schematic flowchart of another audio playback method according to an exemplary embodiment of the present disclosure.

In an exemplary embodiment, as shown in FIG. 7, the audio playback method may include the following steps:

(1) Initializing the scan frequency. Exemplarily, the initial scan frequency may be set to 20 Hz.

(2) Outputting the single frequency point audio: driving the speaker to make sound, and the single frequency point audio data stream (single tone base frequency signal) is converted into the sound output of the speaker, which is propagated through the vibration of the air and the structural members.

(3) Keyboard resonance data sampling: monitoring the sound signal being propagated through vibration of air and structural members in real time by microphone sensor, and then converting it into real-time analog signal. The signal gain of analog signal can be adjusted according to needs, for example, the analog signal can be amplified. The sampled data is shown in FIG. 2.

(4) Performing Fourier Transform (FFT) and harmonic analysis on the sampled data. For example, as shown in FIG. 3, taking the base frequency of 50 Hz as an example, its harmonics are 100 Hz, 150 Hz . . . , and the amplitudes of different harmonics are different. Because the single tone base frequency signal is played, through FFT analysis, except for the base frequency component, other harmonic components of the recorded signal are considered to be caused by the harmonic generated by the resonance between the keyboard and the entire machine. The spectrum obtained after FFT and harmonic analysis is shown in FIG. 3. It can be seen from FIG. 3 that there are harmonics at 100 Hz and 150 Hz except the base frequency signal of 50 Hz, which are caused by resonance. According to the result of spectrum analysis, gain data of base frequency band and each harmonic frequency band can be obtained, as shown in Table 2 or Table 3, that is, harmonic matrix of sampled data can be obtained.

TABLE 2

An Exemplary Harmonic Matrix

| Index | Frequency | Size | Gain | Base Frequency |
|---|---|---|---|---|
| 1 | 50 Hz | 1 | 0.00 dB | 1 |
| 2 | 100 Hz | 0.604 | −4.38 dB | 0 |
| 3 | 150 Hz | 0.321 | −9.87 dB | 0 |
| 4 | 200 Hz | 0.054 | −25.35 dB | 0 |
| 5 | 250 Hz | 0.013 | −37.72 dB | 0 |
| 6 | . . . | . . . | . . . | . . . |

TABLE 3

Another Exemplary Harmonic Matrix

| Index | Frequency | Size | Gain | Base Frequency |
|---|---|---|---|---|
| 1 | 50 Hz | 1 | 0.00 dB | 1 |
| 2 | 100 Hz | 0.928 | −0.65 dB | 0 |
| 3 | 150 Hz | 0.774 | −2.23 dB | 0 |
| 4 | 200 Hz | 0.653 | −3.70 dB | 0 |
| 5 | 250 Hz | 0.013 | −37.72 dB | 0 |
| 6 | . . . | . . . | . . . | . . . |

(5) Analyzing the gain of harmonic frequency band, and determining whether the gain at all base frequency multiplier in the harmonic matrix is less than or equal to the preset harmonic gain threshold, that is, whether resonance occurs. As an example, the preset harmonic gain threshold may be −3 dB, i.e. whether the harmonic energy is less than or equal to half of the base frequency energy is determined, and if it is less than or equal to −3 dB, the harmonic energy is within a reasonable range; if it is greater than-3 dB, the harmonic energy is too strong. Because different keyboards are matched with different structural members, resonances with different strength will be produced, which will have an impact on the standard for determining harmonic gain. An embodiment of the present disclosure determines whether resonance has occurred at the base frequency by comparing the harmonic gain with a preset harmonic gain threshold. In other exemplary embodiments, the preset harmonic gain threshold may be −2.5 dB or any other value less than 0.

When there is at least one harmonic gain greater than-3 dB, the harmonic energy is too strong, and we think that the keyboard produces resonance noise at this time. For example, the gains of 100 Hz harmonic (second harmonic) and 150 Hz harmonic (third harmonic) in the harmonic matrix of Table 3 are both greater than-3 dB, indicating that the energy at this base frequency (50 Hz) is too large, resulting in resonance between the keyboard and the structural member, and the energy of this base frequency needs to be limited. When the base frequency energy is suppressed, the harmonic energy will also be reduced. The audio gain of the single tone base signal is suppressed by a step of z dB each time, and, for example, z can be −3, and then re-output through the speaker until the harmonics sampled by the microphone at that frequency no longer exceed the half-power point, i.e. —3 dB. Embodiments of the present disclosure find the most suitable gain of the resonance frequency point more accurately and quickly by suppressing the step size. In other exemplary embodiments, the suppression step may be −2 dB or any other value. In still other exemplary embodiments, the suppression step size may not be a fixed value (i.e., the size of the suppression step size may be dynamically adjusted), and the size of the suppression step size may be adjusted according to the size of the harmonic gain. When the harmonic gain is greater than the preset harmonic gain threshold and the greater the harmonic gain, the greater the absolute value of the suppression step size, and the less the suppression step size. When the harmonic gain is greater than the preset harmonic gain threshold and the less the harmonic gain, the less the absolute value of the suppression step size, the greater the suppression step size (because the suppression step size is negative, the audio gain of the single frequency point audio output by the current audio output unit+the suppression step size=the audio gain of the single frequency point audio output by the next audio output unit).

When all harmonic gains are less than or equal to −3 dB, it means that the harmonic energy is within a reasonable range, and the keyboard will not generate resonance noise at this time. As shown in Table 2, the Base is 50 Hz, the Magnitude is 1, and the corresponding Gain is 0 dB; the harmonics are 100 Hz, 150 Hz . . . and the amplitudes are all less than 1. The corresponding gains are calculated by FFT analysis. It can be seen from Table 2 that the harmonic parts in the harmonic table are all less than-3 dB. At this time, the audio resonance table can be updated, and the first audio gain corresponding to the current scan frequency point can be recorded by the audio resonance table.

(6) After updating the audio resonance table, determining whether the frequency of the single tone base frequency signal output by the speaker is less than 500 Hz; if it is less than 500 Hz, adjusting the scan frequency to the next frequency point, and returning to step (2) to continue execution; if it is equal to 500 Hz, finishing the scan, and an audio resonance table within 20 Hz~500 Hz is obtained.

If the output frequency is less than 500 Hz, it indicates that the scan for low frequency band has not been completed, and the output gain is reset to 0 dB. Setting the output gain to 0 dB here is to reset the set output audio gain to the normal size without increasing or decreasing, which is equivalent to the reset of system volume, so as to prevent the scan analysis results of subsequent frequency points from being affected after the output audio gain at the previous frequency point is reduced.

If the output frequency is equal to 500 Hz, it indicates that the scan is finished. At this time, an audio resonance table within 20 Hz~500 Hz will be obtained. As shown in Table 1, the audio resonance table records one or several frequency points that cause keyboard resonance, as well as the maximum gain that can be set at the corresponding frequency points. At the frequency points where resonance does not occur, the gain is 0 dB, which are not increased or decreased, that is, the resonance frequency scan data of the keyboard is obtained. The data in the audio resonance table will be different according to different combinations of keyboards and structural members.

In an embodiment of the present disclosure, when adjusting the scan frequency, the adjustment direction can be positive adjustment or negative adjustment, depending on the setting of the initial scan frequency, for example, the initial scan frequency can be set to 20 Hz, and at this time, the positive adjustment mode is adopted to incrementally scan from 20 Hz to 500 Hz one by one. In other exemplary embodiments, the initial scan frequency may be set to 500 Hz, in which case the negative adjustment mode is adopted to scan in descending order from 500 Hz to 20 Hz.

(7) Updating the corresponding audio resonance table data to the equalizer data table. At this time, the equalizer data table contains the keyboard resonance data of the current audio playback device, and if music is played again at this time, the keyboard resonance will not occur.

The audio playback method according to the embodiments of the present disclosure actively triggers the resonance of the keyboard at each scan frequency point through a frequency-scan mode, suppresses the audio gain of the frequency point after finding the frequency point triggering the resonance, continues to use the suppressed gain to trigger the resonance of the keyboard again until the frequency point no longer forms resonance under a specific audio gain. It uses the obtained first audio gain of the audio resonance table to correct the low-frequency band gain characteristic of the equalizer after all the frequency points possibly causing the resonance are found, the location is accurate, thereby effectively improving the resonance problem of the keyboard while taking into account the bass use experience of users.

In actual use, the mode of "suppressing keyboard noise" can be added to the system mode in coordination with the system setting. "Suppressing keyboard noise" belongs to a usage scenario setting of the system. Each audio player in mass production will be implemented calibration for the keyboard resonance noise before leaving the factory, and this mode can be provided to terminal users. When this mode is turned on, the keyboard noise can be greatly improved, and the impact on the user's bass listening effect is minimized.

Figure 8:
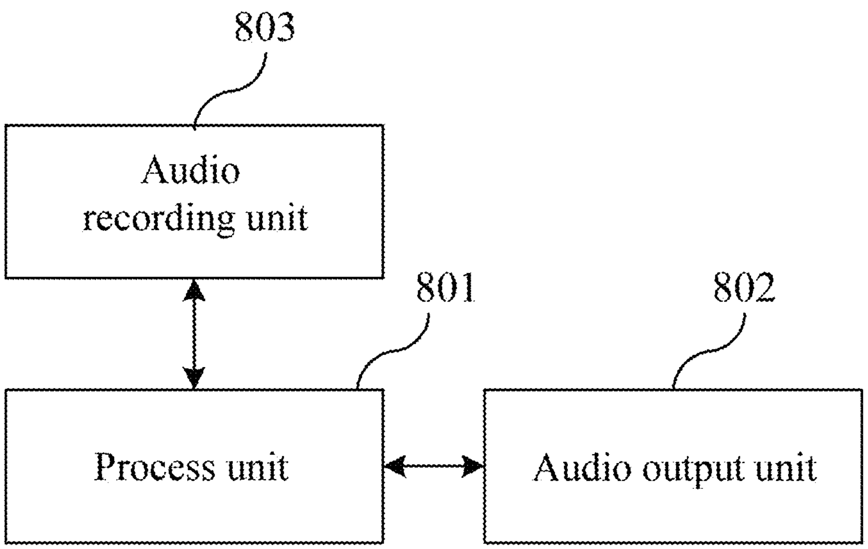
FIG. 8 is a schematic diagram of a structure of an audio playback device according to an exemplary embodiment of the present disclosure.

As shown in FIG. 8, an embodiment of the present disclosure further provides an audio playback device including a process unit 801 and an audio output unit 802, wherein:

the process unit 801 is configured for acquiring an audio resonance table of the audio playback device, wherein the audio resonance table includes one or more first frequency points and a first audio gain corresponding to the first frequency points, when the audio playback device outputs audio using the first audio gain at the first frequency point, the signal gain of the generated harmonic band signal is less than or equal to a preset harmonic gain threshold; processing the audio to be output according to the first frequency point and the first audio gain in the audio resonance table; and outputting the processed audio to the audio output unit 802; and the audio output unit 802 is configured for playing the processed audio.

In some exemplary embodiments, the audio playback device further includes an audio recording unit 803, wherein: The audio recording unit 803 includes a microphone sensor and a recording process module connected with the microphone sensor, the recording process module is configured for converting an analog signal recorded by the microphone sensor into a digital signal.

In other exemplary embodiments, the audio playback device may not include the audio recording unit 803, in which case FFT and harmonic analysis of the generated baseband signal and harmonic band signal may be performed by an external signal processing device to determine the signal gain of the harmonic band signal.

In some exemplary embodiments, the audio output unit 802 includes a speaker.

In some exemplary embodiments, the audio playback device further includes a keyboard (not shown), the keyboard including multiple keys, the multiple keys include at least one first key having an area greater than or equal to a preset area threshold, wherein: There is one or multiple microphone sensors, and at least one of the microphone sensors is disposed in the area where the first key is located.

In some exemplary embodiments, the process unit 801 is further configured for determining the scan frequency point list; performing one or more single frequency point audio tests on each scan frequency point in the scan frequency point list to determine a first audio gain corresponding to each scan frequency point, the single frequency point audio test includes: playing the single frequency point audio through the audio output unit, the single frequency point audio generates a baseband signal and a harmonic band signal, and determining a signal gain of the harmonic band signal; and generating an audio resonance table of the audio playback device.

In some exemplary embodiments, the process unit 801 is further configured for determining the scan frequency point list; performing the following operations for each scan frequency point in the scan frequency point list to obtain the audio resonance table of the audio playback device: initializing the audio gain of the current scan frequency point; outputting a single frequency point audio of the current scan frequency point through the audio output unit 802, wherein the single frequency point audio is propagated through vibration of the air and structural members of the audio playback device to generate a baseband signal and a harmonic band signal; determining the signal gain of the harmonic band signal and determining whether the signal gain of the harmonic band signal is less than or equal to a preset harmonic gain threshold; when the signal gain of the harmonic band signal is less than or equal to the preset harmonic gain threshold, recording the audio gain of the single frequency point audio output by the current audio output unit 802 as the first audio gain corresponding to the current scan frequency point; when the signal gain of the harmonic band signal is greater than a preset harmonic gain threshold value, reducing the audio gain of the single frequency point audio output by the current audio output unit 802 and returning to the step of outputting the single frequency point audio of the current scan frequency point through the audio output unit 802 to execute in a loop.

In some exemplary embodiments, the determining of a scan frequency point list includes: determining a lowest scan frequency point, a highest scan frequency point, and a frequency scan step, the lowest scan frequency point is between 20 Hz and 30 Hz, the highest scan frequency point is between 450 Hz and 650 Hz, and the frequency scan step is between 1 Hz and 3 Hz.

In some exemplary embodiments, when reducing the audio gain of the single frequency point audio output by the current audio output unit 802, z dB is changed each time, and z is between −1 and −3.

In some exemplary embodiments, a preset harmonic gain threshold is less than-1 dB.

In some exemplary embodiments, the first audio gain is 0 dB or y dB, y<0.

In some exemplary embodiments, the process unit 801 is further configured for acquiring an equalizer data table of the audio playback device; generating a comprehensive signal gain table according to the audio resonance table and the equalizer data table; and processing the audio to be output according to the comprehensive signal gain table.

In some exemplary embodiments, the generating of a comprehensive signal gain table according to an audio resonance table and an equalizer data table includes: generating an initial signal gain table according to the equalizer data table; extracting all first frequency points having a first audio gain less than 0 dB in the audio resonance table; inserting all extracted first frequency points with first audio gain less than 0 dB and corresponding first audio gain into an initial signal gain table to obtain a comprehensive signal gain table.

An embodiment of the disclosure further provides an audio playback device, including a memory; and a processor coupled to the memory, the processor is configured to, based on instructions stored in the memory, perform the steps of the audio playback method as described in any embodiment of the present disclosure.

Figure 9:
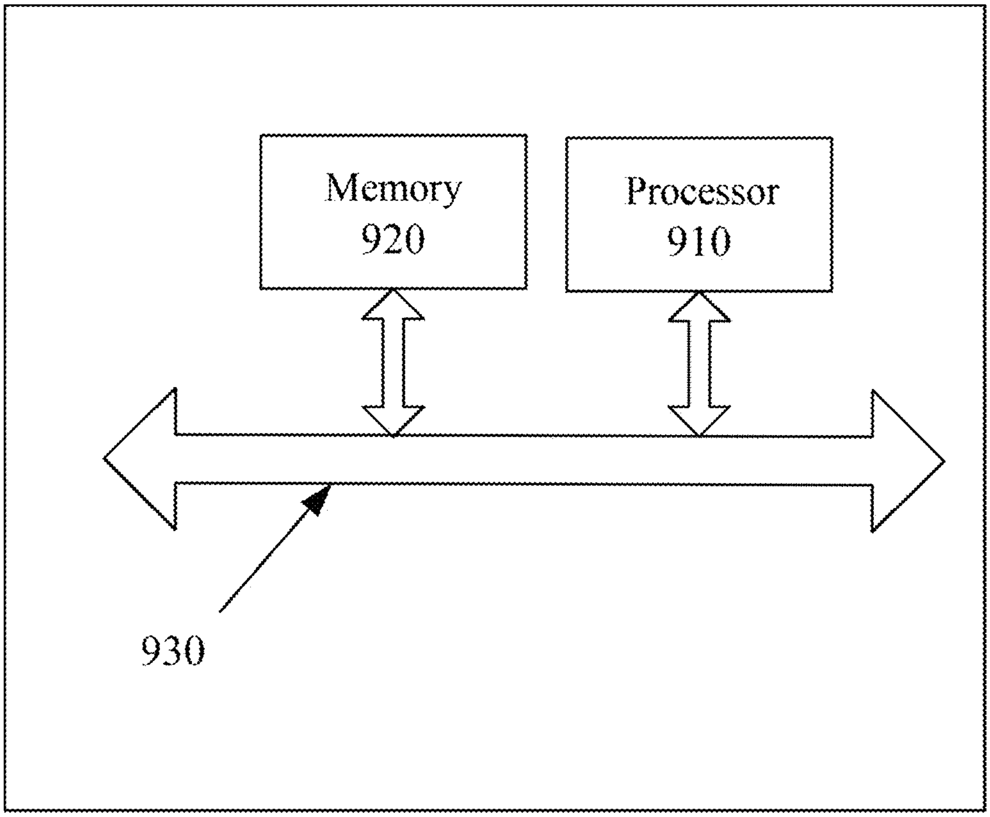
FIG. 9 is a schematic diagram of a structure of another audio playback device according to an exemplary embodiment of the present disclosure.

As shown in FIG. 9, in one example, the audio playback device may include a processor 910, a memory 920 and a bus system 930. The processor 910 and the memory 920 are coupled through the bus system 930, the memory 920 is used for storing instructions, and the processor 910 is used for executing the instructions stored in the memory 920 for acquiring an audio resonance table of the audio playback device, wherein the audio resonance table includes one or more first frequency points and a first audio gain corresponding to the first frequency points, when the audio playback device outputs audio using the first audio gain at the first frequency point, the signal gain of the generated harmonic band signal is less than or equal to a preset harmonic gain threshold; processing the audio to be output according to the first frequency point and the first audio gain in the audio resonance table; and outputting the processed audio.

It should be understood that the processor 910 may be a Central Processing Unit (CPU), or the processor 910 may be another general-purpose processor, a Digital Signal Processor (DSP), an Application Specific Integrated Circuit (ASIC), a Field Programmable Gate Array (FPGA), or another programmable logic device, a discrete gate or a transistor logic device, a discrete hardware component, etc. The general-purpose processor may be a microprocessor, or the processor may be any conventional processor, etc.

The memory 920 may include a read only memory and a random access memory, and provides instructions and data to the processor 910. A portion of the memory 920 may further include a non-volatile random access memory. For example, the memory 920 may store information of a device type.

The bus system 930 may include a power bus, a control bus, a status signal bus, or the like in addition to a data bus. However, for clarity of illustration, various buses are all denoted as the bus system 930 in FIG. 9.

In an implementation process, processing performed by a processing device may be completed through an integrated logic circuit of hardware in the processor 910 or instructions in a form of software. That is, acts of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory or an electrically erasable programmable memory, or a register, etc. The storage medium is in the memory 920, and the processor 910 reads information in the memory 920 and implements the acts in the above method in combination with its hardware. In order to avoid repetition, detailed description is not provided here.

An embodiment of the present disclosure further provides a storage medium on which a computer program is stored, and when the program is executed by the processor, the audio playback method as described in any embodiment of the present disclosure is achieved.

In some possible embodiments, aspects of the audio playback method provided by the present application may be implemented in the form of a program product, which includes a program code. When the program product is run on a computer device, the program code is used to enable the computer device to perform the acts in the audio playback method according to various exemplary embodiments of the present application as described in this specification. For example, the computer device may perform the audio playback method described in the embodiments of the present application.

For the program product, any combination of one or more readable media may be used. The readable medium may be a readable signal medium or a readable storage medium. The readable storage medium may be, for example, but is not limited to, an electrical, magnetic, optical, electromagnetic, infrared, or semiconductor system, apparatus, or device, or a combination of any of the above. More specific examples (non-exhaustive list) of the readable storage medium include: an electrical connection with one or more wires, a portable disk, a hard disk, a Random Access Memory (RAM), a Read-only Memory (ROM), an Erasable Programmable Read-only Memory (EPROM or flash memory), an optical fiber, a portable Compact Disk Read-only Memory (CD-ROM), an optical storage device, a magnetic storage device, or any suitable combination of the above.

The drawings of the present disclosure only involve structures involved in the present disclosure, and other structures may refer to conventional designs. The embodiments of the present disclosure and features in the embodiments may be combined to each other to obtain new embodiments if there is no conflict.

Those of ordinary skills in the art should understand that modifications or equivalent replacements may be made to the technical solutions of the present disclosure without departing from the essence and scope of the technical solutions of the present disclosure, and shall all fall within the scope of the claims of the present disclosure.

The invention claimed is:

1. An audio playback method of an audio playback device, comprising:

acquiring an audio resonance table of the audio playback device, wherein the audio resonance table comprises one or more first frequency points and a first audio gain corresponding to a first frequency point of the one or more first frequency points, wherein a signal gain of a harmonic band signal generated by the audio playback device in a process of outputting audio using the first audio gain at the first frequency point is less than or equal to a preset harmonic gain threshold;

processing the audio to be outputted according to the first frequency point and the first audio gain in the audio resonance table; and outputting the processed audio, wherein before acquiring the audio resonance table of the audio playback device the method further comprises:

determining a scan frequency point list;

performing one or more single frequency point audio tests on each scan frequency point in the scan frequency point list to determine the first audio gain corresponding to each scan frequency point, wherein the single frequency point audio tests comprise: playing a single frequency point audio, wherein the single frequency point audio generates a baseband signal and the harmonic band signal, determining the signal gain of the harmonic band signal, and recording an audio gain corresponding to a current single frequency point audio as the first audio gain corresponding to the single frequency point based on a determination that the signal gain of the harmonic band signal is lower than a preset harmonic gain threshold; and generating the audio resonance table of the audio playback device.

2. The audio playback method according to claim 1, wherein performing one or more single frequency point audio tests on each scan frequency point in the scan frequency point list comprises:

initializing the audio gain of a current scan frequency point;

outputting the single frequency point audio of the current scan frequency point, wherein the single frequency point audio is propagated through vibration of air and a structural member of the audio playback device to generate the baseband signal and the harmonic band signal;

determining the signal gain of the harmonic band signal and determining whether the signal gain of the harmonic band signal is less than or equal to the preset harmonic gain threshold;

based on a determination that the signal gain of the harmonic band signal is less than or equal to the preset harmonic gain threshold, recording the audio gain of a current output single frequency point audio as the first audio gain corresponding to the current scan frequency point; and based on a determination that the signal gain of the harmonic band signal is greater than the preset harmonic gain threshold, reducing the audio gain of the current single frequency point audio, and returning to the step of outputting the single frequency point audio of the current scan frequency point and continuing to execute in a loop.

3. The audio playback method according to claim 2, wherein during reducing the audio gain of the current output single frequency point audio, the audio gain is varied by z dB each time, where z is between −1 and −3.

4. The audio playback method according to claim 1, wherein determining the scan frequency point list comprises:

determining a lowest scan frequency point between 20 Hz and 30 Hz, a highest scan frequency point between 450 Hz and 650 Hz, and a frequency scan step size.

5. The audio playback method according to claim 1, wherein the preset harmonic gain threshold is less than −1 dB.

6. An audio playback device, comprising a memory; and a processor coupled to the memory, the processor is configured to, based on instructions stored in the memory, perform the steps of the audio playback method according to claim 1.

7. A non-transitory computer readable storage medium, on which a computer program is stored, and when the program is executed by a processor, the audio playback method according to claim 1 is implemented.

8. An audio playback device, comprising an audio output unit and a process unit, wherein:

the process unit is configured for acquiring an audio resonance table of the audio playback device, wherein the audio resonance table comprises one or more first frequency points and a first audio gain corresponding to a first frequency point of the one or more first frequency points, wherein a signal gain of a harmonic band signal generated by the audio playback device in a process of outputting audio using the first audio gain at the first frequency point is less than or equal to a preset harmonic gain threshold; processing an audio to be outputted according to the first frequency point and the first audio gain in the audio resonance table; and outputting the processed audio to the audio output unit; and the audio output unit is configured for playing the processed audio, wherein before acquiring the audio resonance table of the audio playback device, the process unit is further configured for:

determining a scan frequency point list;

performing one or more single frequency point audio tests on each scan frequency point in the scan frequency point list to determine the first audio gain corresponding to each scan frequency point, wherein the single frequency point audio tests comprise: playing a single frequency point audio, wherein the single frequency point audio generates a baseband signal and the harmonic band signal, determining the signal gain of the harmonic band signal, and recording an audio gain corresponding to a current single frequency point audio as the first audio gain corresponding to the single frequency point in based on a determination that the signal gain of the harmonic band signal is lower than a preset harmonic gain threshold; and generating the audio resonance table of the audio playback device.

9. The audio playback device according to claim 8, further comprising an audio recording unit, wherein:

the audio recording unit comprises a microphone sensor and a recording process module connected with the microphone sensor, the recording process module is configured for converting an analog signal recorded by the microphone sensor into a digital signal; and the audio output unit comprises a speaker.

10. The audio playback device according to claim 9, further comprising a keyboard, the keyboard comprises a plurality of keys, the plurality of keys comprise at least one first key having an area greater than or equal to a preset area threshold, wherein:

there is one of the microphone sensor or there are a plurality of microphone sensors, and at least one of the microphone sensors is disposed in an area where the first key is located.

* * * * *